Aug. 2, 1966    P. M. FINCH ETAL    3,263,591
VENTILATION OF SALOON MOTOR VEHICLE
Filed April 30, 1964    2 Sheets-Sheet 1

INVENTORS.
PETER M. FINCH
ALAN F. PETHER
BY Thomas J. Green Jr.
ATTORNEY

Aug. 2, 1966    P. M. FINCH ETAL    3,263,591
VENTILATION OF SALOON MOTOR VEHICLE
Filed April 30, 1964    2 Sheets-Sheet 2

INVENTORS.
PETER M. FINCH
ALAN F. PETHER

BY Thomas J. Greer jr.
ATTORNEY

United States Patent Office 3,263,591
Patented August 2, 1966

3,263,591
VENTILATION OF SALOON MOTOR VEHICLES
Peter M. Finch and Alan Frank Fether, Oxford, England, assignors to Pressed Steel Company Limited, Oxford, England, a British company
Filed Apr. 30, 1964, Ser. No. 363,703
2 Claims. (Cl. 98—2)

This invention relates to the ventilation of fixed roof motor vehicle body and concerns particularly the extraction of stale air from the interior of such a vehicle.

In order to provide adequate extraction of stale air from the interior of modern vehicles, it has become the usual practice for vehicles to be provided with draughtless ventilation windows or quarter lights which may be fitted at both the front and rear of the car. When in the open position, movement of the car causes the window panels to act as extractors and as air intakes. Furthermore, it is known, particularly in van bodywork, for the roof of the car to be fitted with a ventilation opening having an outwardly openable flap for extracting stale air from the interior of the vehicle, and in some cases a cowling is fitted to the roof which serves to direct fresh air into and extract stale air from the interior of the vehicle.

The object of this invention is to provide a fixed roof motor vehicle body from which, when the vehicle is moving, stale air may be extracted independently of any quarter-lights wherewith the vehicle may be fitted, and which vehicle does not have any protrusion or projection breaking the roof line.

According to the invention, a fixed roof motor vehicle body includes a slot which is formed in a low pressure region of the roof of the vehicle and which is provided with a hinged, downwardly openable, closure flap, and a duct or trough communicating with the slot and with at least one air extractor opening suitably positioned in the interior of the body.

Preferably, the vehicle is provided with an air inlet opening formed on each side of the roof adjacent the rear window, and the openings are each connected to a duct or channel leading to an air outlet into the interior of the vehicle.

The inlet openings may be formed in a high pressure region of the roof so that fresh air is forced into the opening or the openings may be provided with scoops or louvres for directing the air into the openings.

Each of the air outlets may comprise an openable grille, or an air nozzle of the type which may be manually swivelled to direct the incoming fresh air in any required direction and which is provided with means for closing the nozzle.

The extraction slot, conveniently comprises a transverse central slot formed in the front of the roof of the vehicle and provided with a trough fitted with drainage means so that water entering the slot cannot pass into the interior of the vehicle.

The trough may extend rearwardly from the extraction slot and the rear of the trough may be fitted with a grille. Alternatively, the trough may be formed integrally with, or be secured to, the windscreen header panel whilst ducts, which may include, or be formed by, a suitably boxed-in header panel and/or cant rail, may extend from the trough to air extracting openings appropriately positioned in the interior of the car. Thus, in the finished car the trough and ducts may be completely or partially covered by the roof lining.

It will be understood, that fresh air may be admitted to the interior of the vehicle through a heater and windscreen demisting system in addition to the air outlets connected to the air inlets formed on each side of the roof. Therefore, fresh air may be admitted at both the front and the rear of the interior of the vehicle and thus adequately ventilate the vehicle, before it is drawn out through the extraction slot.

The invention is described, by way of example, with reference to the accompanying drawings, in which.

Figure 1:
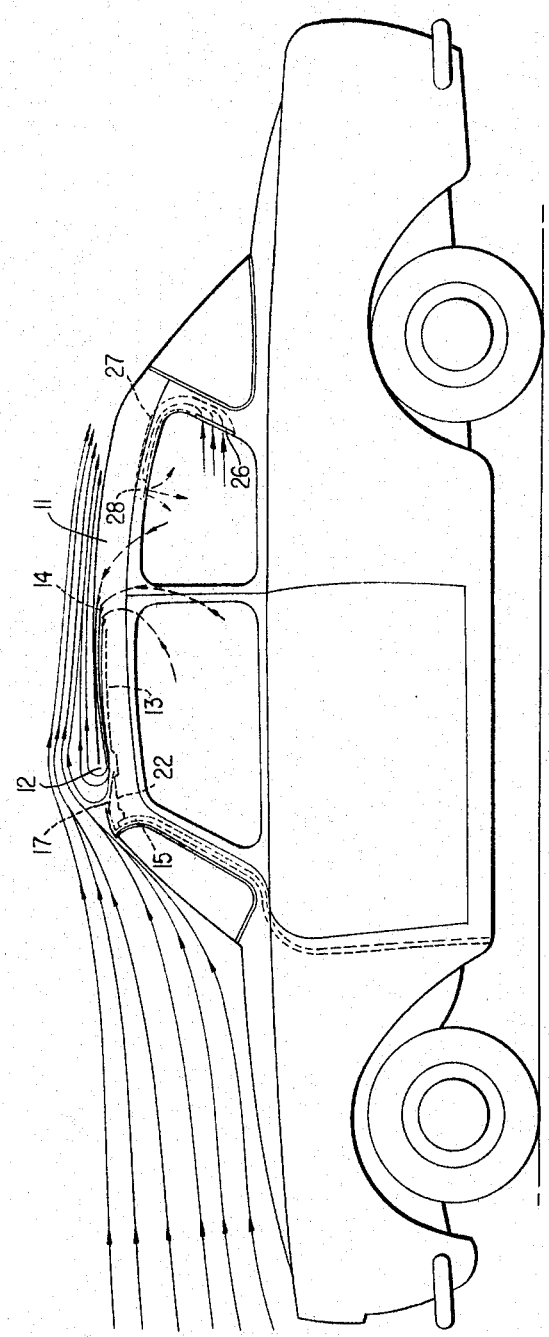
FIGURE 1 is a side elevation of a motor vehicle showing schematically the air flow over the roof when the vehicle is moving.
Figure 2:
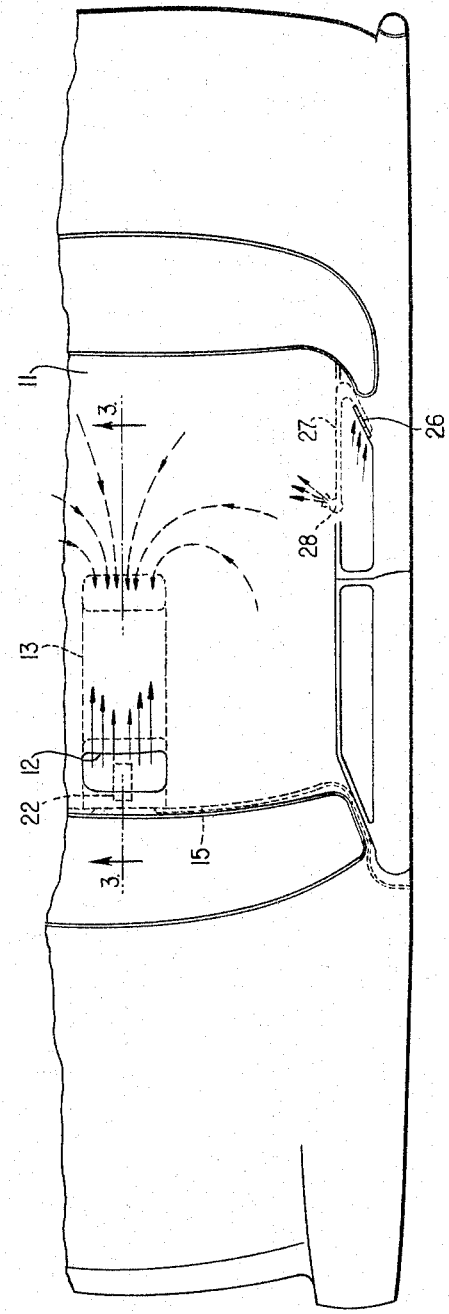
FIGURE 2 is a fragmentary plan view of the vehicle shown in FIGURE 1.

The vehicle shown in FIGURES 1 and 2 has a roof panel 11 which is formed with a transverse slot 12 extending across the centre of the roof. Extending both forwardly and rearwardly of the slot 12 and secured to the underside of the roof panel 11 is a trough or duct 13. The rear of the trough 13 is fitted with a grille 14 and the base of the trough slopes downwardly towards the front end from which extend drain tubes 15. Immediately to the rear of the slot 12, the space defined by the roof panel 11 and the trough 13 is fitted with a wire grille 16.

The slot 12 is provided with a hinged, downwardly openable, flap 17 which is pivoted on a spindle 18 and which supports resilient sealing means 19.

Secured to the flap 17 is an arcuate lever 20 which passes through a seal 21 fixed in a raised portion 22 of the trough 13. The raised portion 22 of the trough 13 accommodates a handle 23 which is attached to the lever 20 at pivot 24 and which carries a roller 25.

Figure 3:
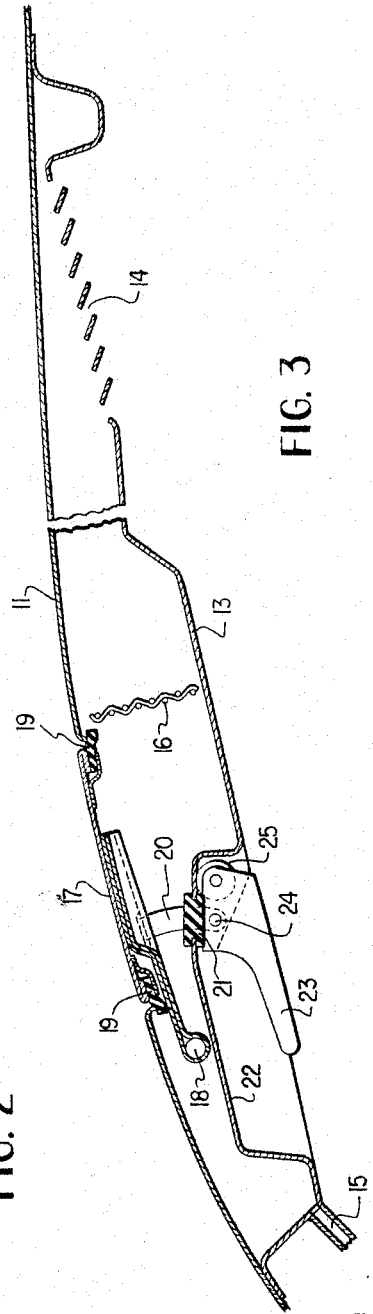
FIGURE 3 is an enlarged sectional view taken on the line 3—3 in FIGURE 2.

As will be seen in FIGURE 3 downward movement of the forward end of the handle 23, whilst causing the handle to swing about pivot 24, (which simultaneously swings about the spindle 18 as the flap 17 opens) causes the roller 25 to move forwardly to an "over-centre" position in front of pivot 24 effecting the locking of the flap 17 in an open position.

Thus, with the flap 17 open and the vehicle moving, the negative pressure caused by the air flow over the roof allows stale air from the interior of the vehicle to be forced through the grille 14, along the space between the roof panel 11 and the trough 13, and extracted out of the slot 12.

When the vehicle is moving, the stress of extracted air is normally sufficiently strong to deflect any falling leaves, rain or other matter away from the slot and prevent any ingress; however, when the vehicle is stationary or moving very slowly, rain falling through the slot 12 will run down the forwardly sloping trough 13 and pass to the exterior of the car through the drain tubes 15, whilst leaves or the like are prevented from reaching the interior of the car by the wire grille 16.

Preferably and as shown in FIGURES 1 and 2, the vehicle is provided with an inlet opening 26 on each side of the rear window. Each opening 26 is connected to a channel 27 which leads to an air outlet such as a nozzle 28 or an openable grille. The channels 27 may also, or alternatively, be interconnected with air outlets arranged to direct air on to, and so demist, the rear window.

We claim:

1. A vehicle body having a fixed roof panel, one edge of said panel positioned adjacent an air deflecting portion of said vehicle body, said air deflecting portion and said roof panel forming an obtuse angle, whereby upon motion of the vehicle body a region of relatively low air pressure is formed over a surface portion of said roof panel in the vicinity of the vertex of said obtuse angle, a slot in said roof panel adjacent the vertex of said obtuse angle, to thereby expose said slot to relatively low air pressure upon motion of the vehicle body, a closure flap in said roof panel, means to actuate said flap from the interior of the vehicle body, said flap lying generally in the plane of said roof panel when closing said slot, said closure panel opening said slot by movement interiorly of said vehicle body, a generally closed chamber in fluid communication with said slot, said chamber being positioned adjacent the underside of said roof panel, said chamber having an air inlet aperture therein in fluid communication with the interior of said vehicle body, an air inlet opening on at least one side of said roof panel and extending through said roof panel, a duct leading from said inlet opening to the interior of said vehicle body to direct external air to the interior of the vehicle body.

2. A vehicle body having a fixed roof panel, one edge of said panel positioned adjacent an air deflecting portion of said vehicle body, said air deflecting portion and said roof panel forming an obtuse angle, whereby upon motion of the vehicle body a region of relatively low air pressure is formed over a surface portion of said roof panel in the vicinity of the vertex of said obtuse angle, a slot in said roof panel adjacent the vertex of said obtuse angle, to thereby expose said slot to relatively low air pressure upon motion of the vehicle body, a closure flap in said roof panel, means to actuate said flap from the interior of the vehicle body, said flap lying generally in the plane of said roof panel when closing said slot, said closure panel opening said slot by movement interiorly of said vehicle body, a generally closed chamber in fluid communication with said slot, said chamber being positioned adjacent the underside of said roof panel, said chamber having an air inlet aperture therein in fluid communication with the interior of said vehicle body, said closure flap being pivotally mounted and pivoting downwardly to open said slot in said fixed roof panel, said pivot located within said closed chamber, said closed chamber defined by a trough whose upper edges are affixed to the underside of said roof panel, an air inlet opening on at least one side of said roof panel and extending through said roof panel, a duct leading from said inlet opening to the interior of said vehicle body to direct external air to the interior of the vehicle body.

References Cited by the Examiner

UNITED STATES PATENTS 2,987,979  6/1961  Hezler _____ 98—2

FOREIGN PATENTS 1,121,894  5/1956  France.
333,812  8/1930  Great Britain.
404,942  1/1934  Great Britain.

MEYER PERLIN, *Primary Examiner.*